Patented July 8, 1952

2,602,813

UNITED STATES PATENT OFFICE 2,602,813

PREPARATION OF BETA-MONO-THIOCARBAMYL CARBOXYLIC ACID COMPOUNDS

Jacob Eden Jansen, Akron, Ohio, assignor to The B. F. Goodrich Company, New York, N. Y., a corporation of New York No Drawing. Application July 2, 1949, Serial No. 102,927

8 Claims. (Cl. 260—455)

This invention relates to beta-thiocarbamyl derivatives of carboxylic acids, particularly propionic acid, and to a method of preparing the same.

It is disclosed in U. S. Patent 2,356,459 to Frederick E. Küng that beta-lactones, that is, lactones or inner esters of beta-hydroxy carboxylic acids, may be obtained in good yields by the reaction of a ketene with an aldehyde or ketone. In this manner, beta-propiolactone (also called hydroacrylic acid lactone) which has the structure

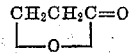

is economically obtained from ketene and formaldehyde.

I have now discovered that beta-propiolactone and also the other beta-lactones will react with salts of mono thiocarbamic acids to form salts of beta-thiocarbamyl carboxylic acids, and the free acids upon acidification.

The reaction proceeds in general as represented by the following equation:

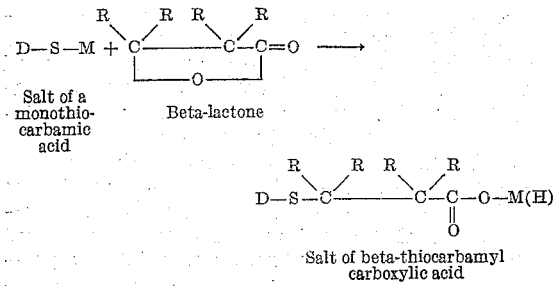

where D is a carbamyl group including unsubstituted and substituted carbamyl groups; M is a positive salt forming group and R is hydrogen or an alkyl radical.

This reaction has been found to proceed quite readily without special conditions whenever it is possible to bring the reactants into effective contact with one another. Since thiocarbamates are not appreciably soluble in beta-lactones, bringing together of the reactants is ordinarily accomplished by the use of a solvent in which the salt will dissolve and ionize, and which also will dissolve the lactone. Many beta-lactones and many monothiocarbamic acid salts are soluble in water; hence, the carrying out of the reaction in aqueous solution is by far the most convenient method of procedure, although in some instances it may be desirable to employ other polar solvents such as alcohols.

As indicated by the general equation, one molecular proportion of beta-lactone for each molecular proportion of the thiocarbamate is theoretically required for the reaction and substantially this amount is preferably employed, but an excess of either of the reactants may be used without any substantial influence on the yield of products. Other conditions for the reaction, such as temperature and pressure are not critical and may be varied widely. Highest yields of the desired product are generally secured when working at temperatures of 0 to 100° C., preferably from 0 to 50° C., and at atmospheric pressure. The most convenient temperature, especially when the reaction is carried out in aqueous solution is from about 10 to 50° C., since the reaction is exothermic and this temperature is maintained without appreciable heating or cooling of the solution. Temperatures as low as —20° C. or lower, or as high as 200° C. or higher, however, are also operable.

Any desired salt of a monothiocarbamic acid may be used to react with the beta-lactones. Since the reaction is preferably conducted in aqueous solution, thiocarbamates which are water-soluble are, of course, preferably used. Examples of preferred salts of monothiocarbamic acids include the alkali metal and ammonium salts of unsubstituted monothiocarbamic acids, and the thiocarbamates prepared by the reaction of an organic amine with carbon oxysulfide in alkaline solutions. These latter thiocarbamates contain an organic radical, which may be either aliphatic, aromatic, or alicyclic in nature, and which is preferably composed only of hydrogen and carbon atoms, attached to the nitrogen of the carbamate structure. Typical examples of such thiocarbamates include the alkali metal and ammonium salts of mono- and dialkyl monothiocarbamic acids such as methyl, ethyl, propyl, butyl, octyl, decyl, diethyl, dipropyl, dibutyl, dihexyl, and didodecyl monothiocarbamic acids; alkali metal and ammonium salts of aryl substituted monothiocarbamic acids such as phenyl monothiocarbamic acid, dibenzyl monothiocarbamic acid and the like; alkali metal and ammonium salts of cycloalkyl monothiocarbamic acids such as dicyclohexyl monothiocarbamic acid and the like, and alkali metal and ammonium salts of alkylene monothiocarbamic acids such as methylene monothiocarbamic acid, pentamethylene monothiocarbamic acid, hexamethylene monothiocarbamic acid, and the like. While the alkali metal and ammonium salts and other water-soluble salts of monothiocarbamic acids are preferred, the use of other salts of monothiocarbamic acids is not excluded.

Beta-propiolactone, the simplest possible beta-lactone, is the preferred beta-lactone for use in this invention because of its low cost, and the ease with which it reacts with thiocarbamates to produce beta-(thiocarbamyl) propionic acid compounds. However, other saturated aliphatic beta-lactones are also useful in the process, among which are such homologs of beta-propiolactone as beta-butyrolactone, beta-valerolactone, beta-isovalerolactone, alpha-methyl beta-propiolactone, alpha-ethyl beta-propiolactone, beta-isopropyl beta-propiolactone, beta-methyl beta-valerolactone, and the like, all of which are liquid and possess the general structure

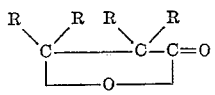

wherein each R is hydrogen or a lower alkyl group, so that the lactone preferably contains from 3 to 8 carbon atoms.

The beta-thiocarbamyl carboxylic acids and their salts obtained as products of the reaction are quite useful organic compounds. Besides being useful as intermediates in the preparation of other compounds, they are also of value in the rubber and plastic and other chemical industries, and for their biological and physiological activities. The free acids are useful as modifiers for the polymerization of conjugated dienes, such as butadiene-1,3. Furthermore, the free acids and the alkali metal and ammonium salts thereof are useful when combined with a fluent carrier, as agents for the control of insects, as fungicides, and for other biological purposes.

The process of this invention is further illustrated by the following examples. It should be understood, however, that variations in the examples in accordance with the foregoing disclosure may be effected without departing from the invention. In the examples all parts are by weight, unless otherwise indicated.

*Example I*

An aqueous solution containing 31.5 parts (.33 mole) of ammonium thiocarbamate dissolved in 150 parts of water is prepared, and to this solution 23.8 parts (.33 mole) of beta-propiolactone are added with stirring at a temperature of 10° C. over a period of about 30 minutes. The reaction mixture is then acidified by the addition of 50 volumes of 37½% hydrochloric acid, whereupon a copious white precipitate is formed. The compound precipitated is filtered from the solution and recrystallized from hot water. An 85% yield of beta-thiocarbamyl propionic acid, a silver-white, crystalline material of the structure,

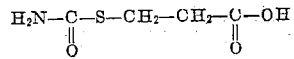

(M. P. 148°–149° C.) is obtained.

| Analysis | Calculated for $C_4H_7O_3SN$ | Found |
|---|---|---|
| C | 32.21 | 32.18 |
| H | 4.70 | 4.79 |
| N | 9.40 | 9.48 |
| S | 21.48 | 21.38 |
| Mol. Wt. | 149 | 149 |

*Example II*

Beta-propiolactone and N-butyl ammonium thiocarbamate are reacted as in Example I. After addition of the beta-lactone is complete, the reaction mixture is acidified with hydrochloric acid whereupon a colorless crystalline precipitate is formed. Upon recrystallization of the product in hot water, an excellent yield of beta-(n-butyl-thiocarbamyl)-propionic acid of the structure,

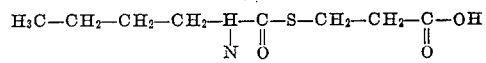

(M. P. 103.5–105° C.) is obtained.

| Analysis | Calculated for $C_8H_{15}O_3SN$ | Found |
|---|---|---|
| C | 46.82 | 46.90 |
| H | 7.32 | 7.45 |
| N | 6.83 | 6.93 |
| S | 15.61 | 15.62 |
| Mol. Wt. | 205 | 210 |

While the above examples illustrate the process of this invention, they by no means include all the various embodiments. Thus, when the examples are repeated with any of the salts of monothiocarbamic acids set forth hereinabove, still other beta-thiocarbamyl propionic acids are obtained in good yield. Moreover, other saturated aliphatic beta-lactones may be substituted for beta-propiolactone, as disclosed, or the reaction conditions such as temperature and quantities of reactants may be varied with but small reduction in yield of the desired product.

Numerous variations and modifications will be apparent to those skilled in the art and are included within the spirit and scope of the invention as defined in the appended claims.

I claim:

1. The method which comprises reacting a beta-lactone of the structure

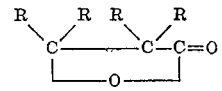

wherein each R is a member of the class consisting of hydrogen and lower alkyl radicals, with a salt of a mono-thiocarbamic acid of the structure DSM, wherein D is a member of the class consisting of N-substituted and unsubstituted carbamyl radicals, and M is a positive salt forming group, thereby to obtain a beta-mono-thiocarbamyl carboxylic acid compound.

2. The method which comprises reacting beta-propiolactone with a salt of a mono-thiocarbamic acid of the structure DSM, wherein D is a member of the class consisting of N-substituted and unsubstituted carbamyl radicals, and M is a positive salt forming group, thereby to obtain a beta-mono-thiocarbamyl propionic acid compound.

3. The method which comprises reacting in aqueous solution a beta-lactone of the structure

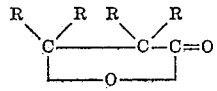

wherein each R is a member of the class consisting of hydrogen and lower alkyl radicals with a salt of a mono-thiocarbamic acid of the structure DSM, wherein D is a member of the class consisting of N-substituted and unsubstituted carbamyl radicals and M is a positive salt forming group, thereby to obtain a beta-mono-thiocarbamyl carboxylic acid compound.

4. The method which comprises reacting in aqueous solution beta-propiolactone with a salt of a mono-thiocarbamic acid of the structure DSM, wherein D is a member of the class consisting of N-substituted and unsubstituted carbamyl radicals and M is a positive salt forming group, thereby to obtain a beta-mono-thiocarbamyl carboxylic acid compound.

5. The method of preparing beta-thiocarbamyl propionic acid which comprises reacting in aqueous solution beta-propiolactone with a water-soluble salt of mono-thiocarbamic acid.

6. The method of preparing beta-thiocarbamyl propionic acid which comprises adding beta-propiolactone to an aqueous solution of a water-soluble salt of mono-thiocarbamic acid, and then acidifying the solution.

7. The method of preparing a beta-alkyl thiocarbamyl propionic acid which comprises reacting in aqueous solution beta-propiolactone and a water-soluble salt of an alkyl mono-thiocarbamic acid, and then acidifying the solution.

8. The method of preparing beta-(N-butyl-thiocarbamyl)-propionic acid which comprises reacting in aqueous solution beta-propiolactone and N-butyl ammonium thiocarbamate, and then acidifying the solution.

JACOB EDEN JANSEN.

REFERENCES CITED

The following references are of record in the file of this patent:

UNITED STATES PATENTS

| Number | Name | Date |
| --- | --- | --- |
| 2,375,083 | Cooper | May 1, 1945 |
| 2,474,839 | Gresham et al. | July 5, 1949 |